Dec. 16, 1952
D. S. McPHEE
2,621,406
APPARATUS FOR USE IN THE PREPARATION
OF DENTAL PROSTHETIC DEVICES
Filed March 7, 1950
3 Sheets-Sheet 1
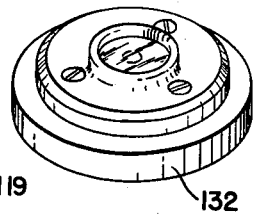
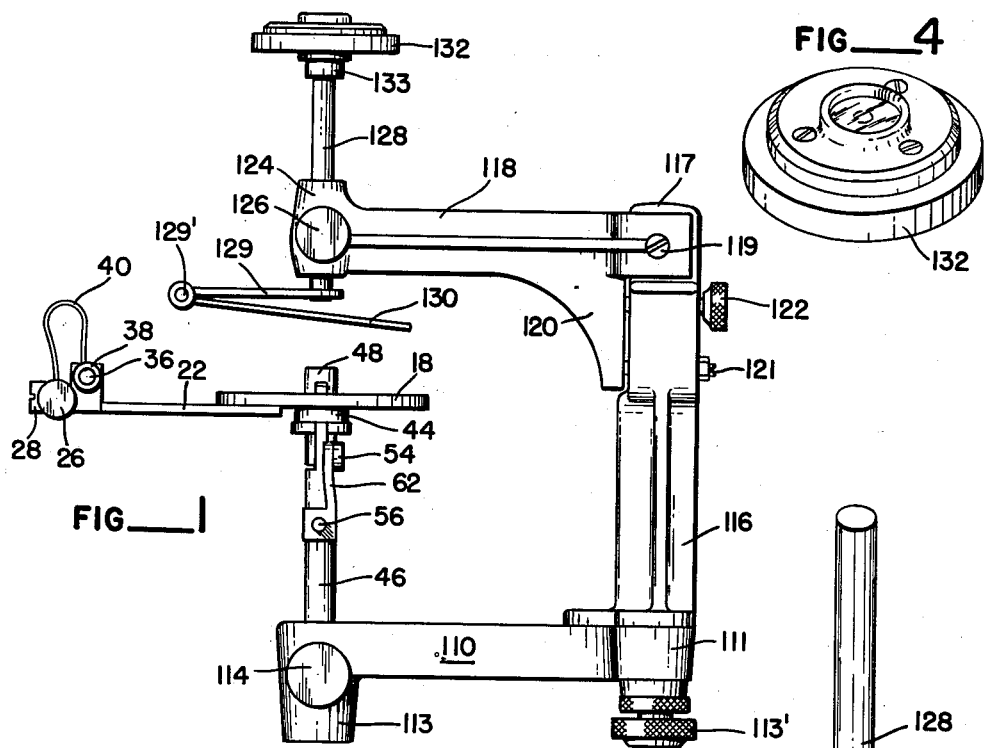
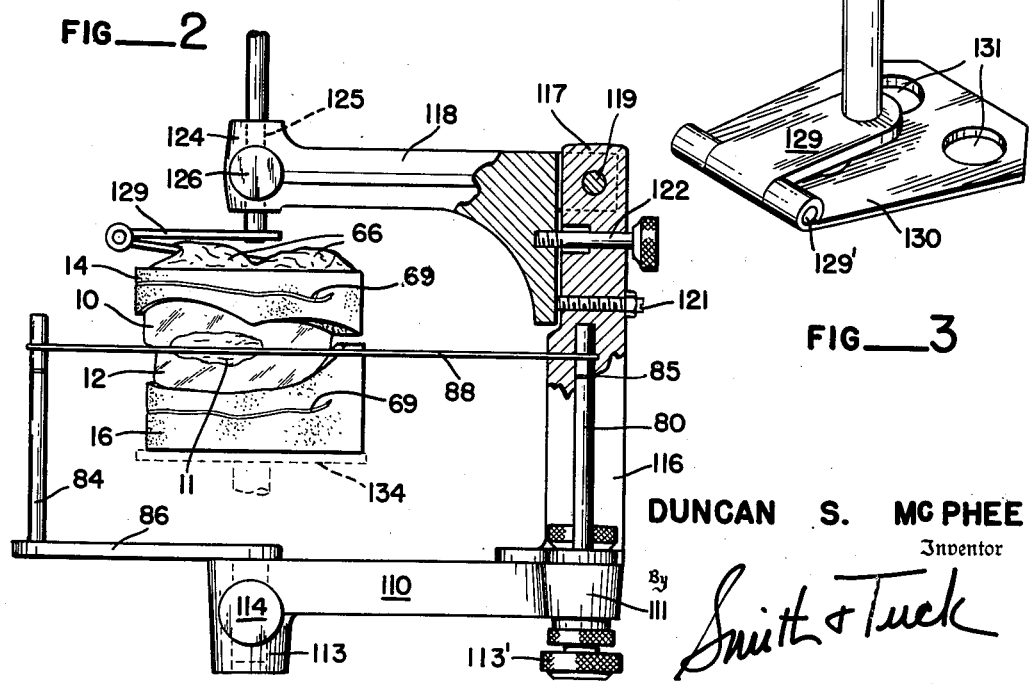
DUNCAN S. MCPHEE
Inventor
By Smith & Tuck
Attorneys Dec. 16, 1952     D. S. McPHEE     2,621,406
APPARATUS FOR USE IN THE PREPARATION
OF DENTAL PROSTHETIC DEVICES
Filed March 7, 1950     3 Sheets—Sheet 2
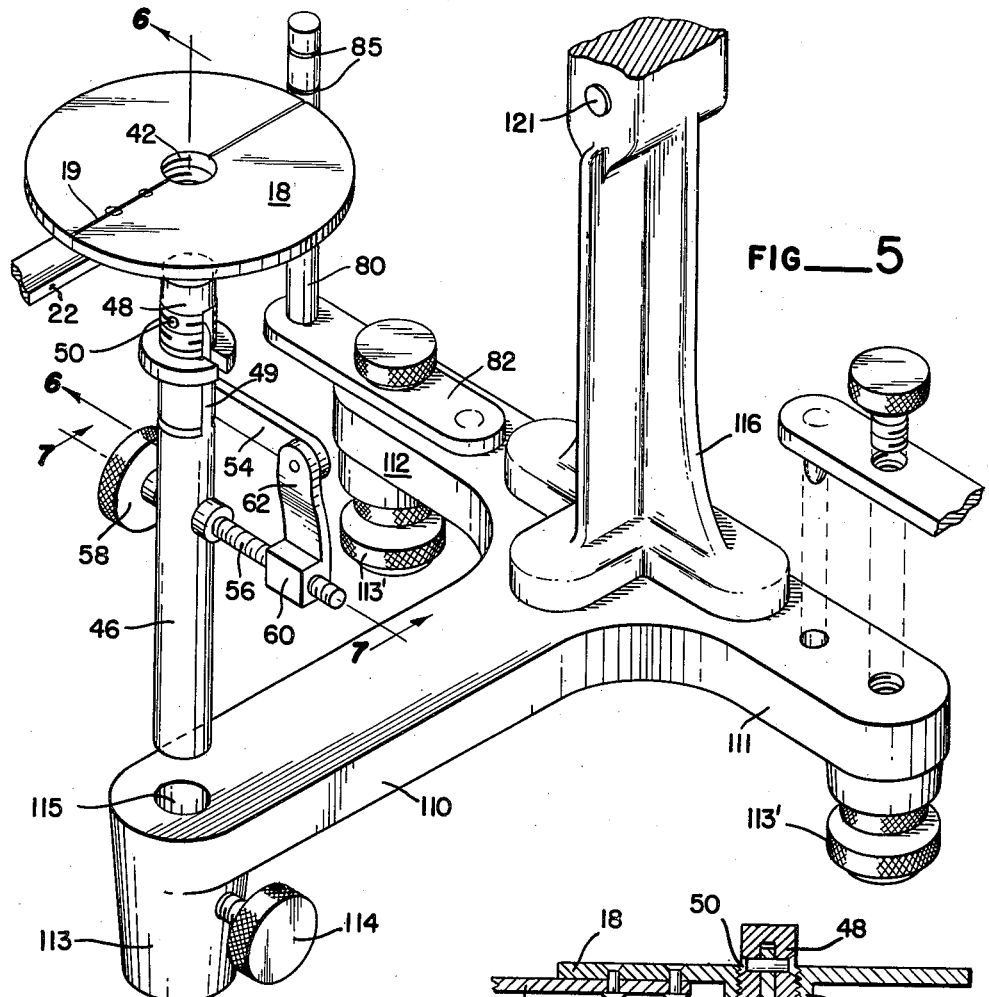
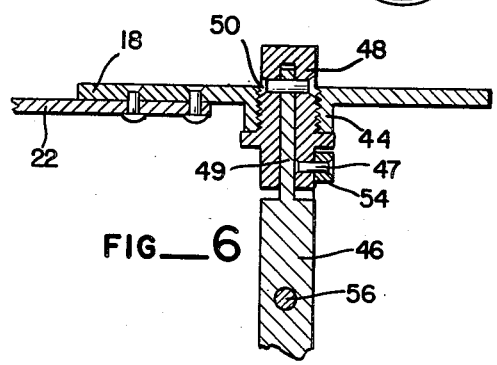
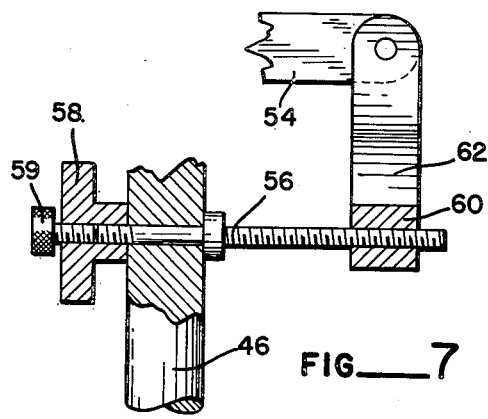
DUNCAN S. McPHEE
Inventor
By Smith + Tuck
Attorneys

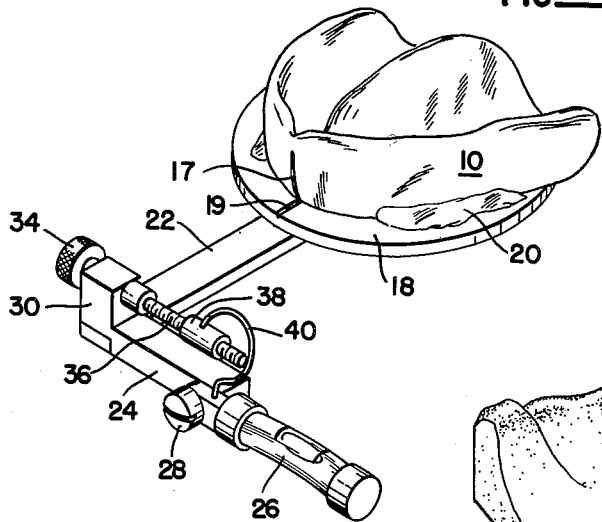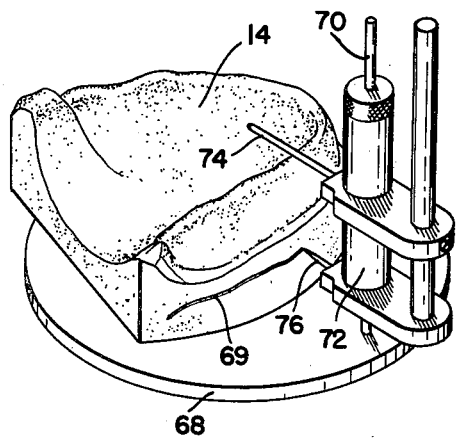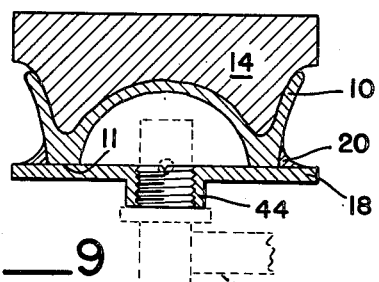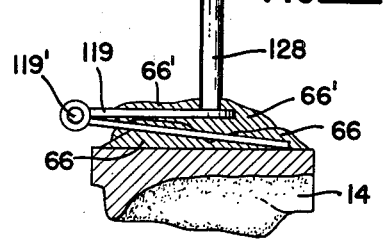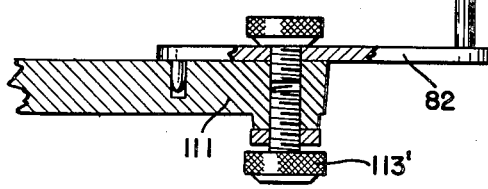

Patented Dec. 16, 1952

2,621,406

UNITED STATES PATENT OFFICE 2,621,406

APPARATUS FOR USE IN THE PREPARATION OF DENTAL PROSTHETIC DEVICES

Duncan S. McPhee, Seattle, Wash.

Application March 7, 1950, Serial No. 148,128

9 Claims. (Cl. 32—32)

This invention relates to improvements in apparatus for use in the preparation of dental prosthetic devices and, more particularly, relates the determination of the inclination of a person's plane of occlusion relative the horizontal and the establishment of that plane in the models when the latter are positioned in an articulator.

In the preparation of dental prosthetic devices that are fully useful, life-like, pleasing and comfortable to the patient, and which function properly in the mouth of the person for whom they are made, it is necessary that the dentist know as much as possible about the characteristics of the patient's jaw. While much can be determined from personal observation it often occurs that a lot of the characteristics are blurred or indeterminable when the patient's natural teeth have been extracted and the maxilla and mandible have an established relation that is largely one of irregular space therebetween with even the actual frontal dimensions lost. Such conditions particularly complicate the establishment in an articulator of the models of the upper and lower jaws that are normally formed according to conventional practices. I have found that if the lateral inclination, if any, that exists in the maxilla relative the horizontal can be accurately determined by means of a bite plate in the mouth, that lateral inclination can be established in the articulator with considerable speed and a most high degree of accuracy. Having established the location or aspect of the maxilla model, it becomes very simple indeed thereafter to establish the corresponding aspect in the articulator of the mandible relative the maxilla in the relation thereto found in the patient's mouth. Then, according to other improved techniques that I have developed, the dentist may proceed with confidence that he will simply and accurately prepare dentures which will be comfortable and function properly when applied to the mouth. In fact such success has been had with the process and apparatuses herein disclosed that seldom, if ever, is it necessary to perform any more than the slightest of post-fitting adjustments between dentures or with regard to their fit on the jaws in the relief of undesirable or harmful pressures.

Among the important objects of my invention therefore has been to provide a simple and accurate method of determining lateral inclinations of a person's jaw in such manner that such determination can be readily reestablished in an articulator as an aid in the mounting of the models in faithful correspondence to nature and to the comfort and suitability of the resultant dentures for mastication and aesthetic purposes; to provide means associated with a maxilla biteplate for producing an accurate determination of maxilla aspect and for transferring that aspect into an articulator; and to provide means for adjusting the models into an articulator to obtain a proper division or bisection of the intermaxillary space relative a desirable plane of occlusion for the production of dentures that properly distribute the grinding pressures of mastication to favor or disfavor bone conditions observed and found in the jaws of the patient.

It will be apparent that these objects are of a general nature and it is pointed out that these and other objects will be more apparent from a reading of the following specification in which is described the techniques and apparatus employed in the practice of my invention, reference being had to the accompanying drawings showing typical structure adapted for use in connection with the preparation of dentures. It is to be understood, however, that other suitable means than those shown here may be employed in the practice of the invention without departing from the scope of the invention as exemplified by the accompanying drawings taken in the broadest spirit that applies thereto.

In the drawings:

Figure 1 is a side view of a Fournet-type articulator including certain appliances which I have developed;

Figure 2 is a side view of the articulator with portions broken away for convenience of illustration and showing upper and lower models and bite-plates in position therein;

Figure 3 illustrates in perspective an upper, hinged mounting plate used in the articulator and Figure 4 is a perspective view of a universal level that I employ;

Figure 5 is an enlarged exploded view in perspective of portions of the articulator and the bite-table and its support column;

Figure 6 is a vertical sectional view across the bite-table, taken on line 6—6 of Figure 5;

Figure 7 is fragmentary vertical sectional view through a portion of the bite-table supporting column as taken on line 7—7 of Figure 5;

Figure 8 is a perspective view of the bite-table and bite-plate showing in detail the bite-table levelling means;

Figure 9 is a vertical sectional view of the bite-table and bite-plate and model therefor;

Figure 10 is a perspective view of the spiling means employed in scribing a line on a model.

Figure 11 illustrates the upper hinged mounting plate in immobilized condition; and Figure 12 shows in sectional detail the construction of an adjusting foot of the lateral arm of an articulator and an upstanding pin used in bisecting the intermaxillary space.

In the preparation of dentures according to my inventions and developments I prefer to use as Fournet-type articulator as shown in the drawings, particularly in Figures 1, 2 and 5. Such a device comprises a T-shaped base formed with a forwardly extending arm 110 and rearwardly located lateral arms 111 and 112. A foot 113 on front arm 110 has a vertical passage 115 for the reception of various appliances and a thumb screw 114 intersects the bored passage 115 to securely clamp the stems of such appliances as may be there inserted.

The lateral arms 111 and 112 each have adjustable feet 113' which may be employed in the levelling of the articulator on a table or bench. It is important in my practice that the articulator be levelled in order that a bite-table 18 (more fully described hereafter) will be disposed on a column that is truly vertical.

Rising from the juncture of the arms 110, 111, and 112 in the articulator is a pillar 116 having a capping boss 117 on the upper end. An upper arm 118 is bifurcated to straddle boss 117 and is pivotally connected thereto by pin 119. A leg 120 depends from arm 118 alongside the pillar and an adjusting screw 121 passing through the pillar permits the establishment and maintenance of a desired right angularity between arm 118 and pillar 116. Locking screw 122 passes through the pillar and seats in leg 120 to prevent pivoting of the arm on occasion. At the forward end of arm 118 is a gudgeon 124 having its upright passage 125 intercepted by a set screw 126 for the reception of mounting pins on appliances used in connection with the articulator. Such an appliance is seen in Figure 3 in which is shown an upper mounting plate comprising the shaft 128, hinge leaf 129 secured thereto at right angles, and the hinged mounting plate 130 which is ported at 131 for the reception of plaster when a model is mounted thereon.

By placing the upper mounting plate in the articulator with its shaft suitably locked in place in gudgeon 124 by screw 126 and attaching the universal bubble level 132 on the upper end of shaft 128 as shown in Figure 1 it is possible through manipulation of the adjustable feet 113' to place the articulator in absolutely vertical position so that the passage 125 directly overlies the passage 115 whereupon appliances placed in the arm 110 and arm 118 will be accurately superposed. The universal level of Figure 4 has a lower socket 133 which snugly fits over the end of shaft 128 and includes the conventional glass faced, liquid filled chamber containing a small bubble that, when the device is level, seeks the highest point in the chamber and is visible from above.

It will be understood that in the practice of my invention I employ the customary technics in the preparation of an upper bite-plate 10 and a lower bite-plate 12 which fit to the models 14 and 16, respectively, of the maxilla and mandible of the patient for whom dentures are to be prepared. As is well known to those skilled in the art, a plastic female impression is first taken of a patient's jaw and from this is molded, by casting therein, a plaster model on which the denture will be constructed. Following the preparation of the model, such as 14 or 16 in Figure 2, a wax bite-plate is molded in conventional manner on the model. The interior recesses of the bite-plate accurately fit to the patient's jaw and may be placed thereon as desired by the dentist, for example as in applying line 17 which corresponds to the median line of the face, I prefer to form the lower portion of the bite-plate with a substantially broad, flat surface as 11 in Figure 9 in order that it may be mounted securely on the bite-table 18, to which it is secured with line 17 coinciding with fore-and-aft median 19 of the bite-table, by the application of wax adhesive 20 as shown in Figure 8.

In the determination of the lateral aspect of the patient's jaw relative horizontal, the upper bite-plate attached to the bite-table, in the manner and arrangement described and shown, is placed in the patient's mouth with the bite-plate firmly seated on the maxilla. At that time the arm 22 will extend forwardly of the mouth between the patient's lips. On arm 22 is the lateral arm 24 which provides the support for the spirit level 26 that is rockably mounted on the generally horizontal screw pivot 28. It will be noted that by this arrangement the spirit level is arranged to rock in an upright plane that is parallel to a similar plane passing laterally through the patient's jaw. Whenever the spirit level is located in that plane so that the bubble is centered in the tube, a determination of the aspect of the patient's jaw laterally with respect to the horizon will be had and whenever the bite-table with the bite-plate thereon is removed from the mouth and subsequently mounted on a support and the spirit level again placed with the bubble centered, the bite-plate will be located laterally in exactly the same position with relation to the horizon that it occupied in the mouth. The reason for this will be more fully explained hereafter.

For convenience of operation in the levelling of the spirit level, and in order to maintain relative adjustments of the bubble to the bite-table during such transfer and mounting, I provide manually operable adjusting and securing means between the spirit level and the supporting arm 22 of the bite-table. Such is clearly shown in Figure 9 to comprise the bearing block 30 in which is rotatably mounted a pin having knurled knob 34 and screw shank 36 on which moves the traveller nut 38. Pin can rotate but can not move longitudinally in block 30 and, as it is rotated, will cause nut 38 to move in whichever direction is indicated by the lead of the threads and the direction of rotation. A semi-rigid small rod or wire link 40 is connected between nut 38 and the spirit level 26. By forming the link 40 as a U-shaped loop and by properly selecting material of suitable resiliency, I can arrange that the rotation of the screw 36 will accurately be translated into movement of nut 38 and a correlative tilting or rocking of the spirit level. In addition, the resiliency of the U-shaped link 40 is such that at all times the link is tensioned to such a degree that any slack between the screw and nut threads is absorbed and lost motion is precluded. This makes it possible to avoid error during the transfer of a predetermined arrangement of the level from the patient's mouth to the supporting device such as an articulator.

Thus, while the bite-plate and the bite-table 18 are in the mouth, the dentist, having first positioned the patient's head vertically according to the upright axis of the body, adjusts his spirit level one way or the other until the bubble therein is accurately located in the center of the tube and the spirit level is horizontal. In this situation, even though the patient's maxilla is not horizontal even though the head is generally vertical, aberrations in the position of the maxilla relative the horizon will be correctly determined and will be capable of reproduction when the bite-plate and model therefor is placed in the articulator.

The center of the bite-table is bored to provide opening 42 which is encircled by interiorly threaded collar 44 on the under side of the table. This is for the purpose of quick-detachably mounting the bite-table on a supporting column 46 which is supported in the articulator. It is preferable that the bite-table be rockable on the column 46 and, while this may be accomplished in several different ways, I prefer the construction shown in Figure 6. In this instance there is a threaded stud 48 that is bifurcated and straddles the pin 49 which is part of the column. A pivot pin 50 hingedly joins the stud to the column so that it may be rocked thereon. The length of the stud and the location of the pivot pin therein is such when the stud is properly joined to the bite-table by being threadedly joined to sleeve 44 the axis of pivot pin 50 coincides with the lateral median 19 of the bite-table. This arrangement insures that when the bite-table 18 is rocked to one side or the other of its axis the surface of the table will always coincide with the axis about which rocking takes place. Thus, with the center of the table positioned over the center of the support column 46 and under the center of the upper support of an articulator even though the bite-table is rocked the bite-plate will not be moved laterally away from its central position in the articulator.

Rocking of the stud on column 46 is obtained by means of moving lever arm 54 which is pivotally connected to stud 48 by pivot pin 47. In a lower position of the column is journalled the screw 56 having knob 58 and on which screw is movable the traveller nut 60. A horn 62 on nut 60 stands above the nut and is pivotally connected with lever 54. The lock screw 59 threaded into knob 58 presses on the end of screw 56 and locks the knob and screw together. Loosening of lock screw 59 permits the disassembly of screw 56 from column 46.

Having in mind the previously described structure, it will be seen that the operator mounts the upper bite-plate 10 on bite-table 18 and while the table is removed from the supporting column inserts the same into the mouth of the patient, fitting the bite-plate to the maxilla. The patient's head is then placed in a vertical position having regard for the upright axis of the body. In difficult cases it will often occur that the maxilla is not horizontal from ridge to ridge even though the head is erect and it is for the determination of this non-horizontal positioning that I have described my apparatus. The spirit level on the bite-table is at that time levelled with the bubble in central location whereupon the bite-table may be removed from the mouth and attached quickly and securely to the column 46 which in turn may be positioned upright in an articulator. It will normally be found that the spirit level 26 is then not horizontally disposed whereupon the dentist or technician will bring it to a level condition by manipulation of the screw 56 and adjustment of the inclination of the stud 48 through movement of nut 60 and link 54 connected thereto. When the spirit level has thus been brought to the horizontal position it and the bite-table with which it is connected will have been returned to the same lateral position that the bite-table occupied in the patient's mouth. In that position it is possible to replace the model of the maxilla in the bite-plate and to mount it in the articulator in exact simulation of the patient's maxilla as to lateral tilting or location.

I have found that with slight preparation of the models before mounting them in the articulator the production of the dentures can be greatly facilitated. Each model has a base face which is employed in mounting the same on the mounting plates. By placing the model flat on a base plate 68 as shown in Figure 10 and employing the spiling means there disclosed I scribe thereon the spiling or guide line 69. The spiling means comprises the upright guide column 70 on which is pivotally and slidably mounted the carriage 72 which has outstanding finger 74 and scribing point 76. The spiling operation is performed by rotating the model 14 on the base-plate 68 with the point 76 in contact with the exposed face of the model and the finger 74 riding on the crest or ridge representing in the model the upper bone line of the patient. It is important that the point 76 be kept at right angles to the ridge being traced during the scribing of line 69.

The mounting of the upper model in the articulator is shown in Figure 2 in which the model 14, having been properly positioned by the use of the bite-table 18 and the bite-plate 10, is cemented to the hinged and ported upper mounting plate 130 by means of plaster of Paris 66 which adheres to the flat face of the model and tends to pass through and mushroom over the edges of openings 131. In this position the model is disposed laterally exactly as its counterpart, i. e. the maxilla of the patient, appeared and was located when the patient's head was vertical. In this Figure 2 is also shown the lower bite-plate 12 and model 16 with the two bite-plates 10 and 12 temporarily joined or locked by fillets 11 which may be either utility wax or plaster as desired. Of course the bite-plates will be locked together with their incisal portions in contact with the proper occlusal relationship established.

In this mounting arrangement described the spiling lines 69 of the models will be exposed to the dentist or technician as seen in Figure 2 even though the bite-plates are concealing the ridges of the models from view. Lines 69 serve as guides in the fore-and-aft tilting of the models in order that there may be a desired bisection of the intermaxillary space between the crests of the jaws as an aid in the correct placement of the teeth for proper chewing and other functions. Bearing in mind that the upper model is at this time still supported on plate 130 and that the hinge between plates 129 and 130 is still free it will be seen that the model and bite-plate assembly can be readily tilted about a lateral axis represented by the hinge pin 129'. To aid in determining in what plane the general mean of the intermaxillary space as shown by lines 69 is to be placed, I attach upstanding pins 80 and base arms 82 to each of the lateral arms and a forward pin 84 supported by base arm 86 to the articulator arm 110. The three pins 80, 80 and 84 are at the apices of a triangle which I graphically establish by snapping a rubber band 88 or by fastening a thread therearound. This triangle lies in a horizontal plane since the pins are scored at 85 in like manner to provide grooves for the reception of the band or thread.

Thus, with the models in place, the spiling lines visible, the plane established by the band or thread 88 delineated, and the hinged upper mounting plate free the technician views the articulator from the side and proceeds to tilt plate 130 relative the supported portion of the hinge until he has bisected the intermaxillary space as he desires. He then locks the upper hinged mounting plate by fusing additional plaster 66' around and between leaf 129 and plate 131 to immobilize the hinge. Thereupon the lower mounting plate conventionally used and shown as 134 in Figure 2 can be placed under the lower model 16 to support it when the bite-plates 10 and 12 have been removed. In this way the two models are placed in an established horizontal and positioned anteriorly and posteriorly by tilting so as to bisect the intermaxillary space thereby creating a plane of occlusion of greatest advantage to the patient. The preparation of the dentures thereafter proceeds according to custom.

Having thus described my invention, I claim:

1. For use in dental prosthetics in the determination of the lateral aspect of the patient's maxilla relative the lateral horizontal, the structure, comprising: a bite-table having a flat upper surface to receive and support a dental bite-plate while the latter is positioned in the patient's mouth, an arm extending forwardly from said bite-table, a spirit level pivotally mounted relative to said arm to swing in an upright plane parallel to a lateral upright plane passing laterally through the patient's maxilla, a manually operable lead screw lateral to said arm alongside said plane of pivoting of said level, a traveller nut on said lead screw, and a link between said nut and said level to translate travel of the nut on said screw into a rocking movement of said spirit level whereby the same is a transferable determination of the relative position of said bite-table to the horizontal.

2. The structure according to claim 1 in which the link between the nut and the level comprises a flexible wire loop securely anchored at each end to one of said elements.

3. The structure according to claim 1 in which there is a raised boss on the forward end of said arm and a lateral branch arm disposed to one side thereof, said spirit level is pivotally mounted on said branch arm near its end and said screw is journalled in said boss to overlie said branch arm, and the link between the traveller nut on the lead screw and the spirit level comprises a flexible wire loop having one end secured to said traveller nut and the other end secured to said spirit level outward of its pivotal mounting on said branch arm.

4. For positioning dental base-plates used in the preparation of dental prosthetic devices, a bite-plate support to be employed in connection with an articulator, comprising: an upright column to be mounted in an articulator base for support, a stud pivotally mounted on the upper end of said column to laterally swing about a horizontal axis, a bite-table having a quick detachable connection with said stud and so arranged that the horizontal pivotal axis of said stud coincides with the upper surface of said bite-table, and a spirit level swingably carried by said bite-table at right angles to said horizontal axis of pivot to indicate when the bite-table is positioned on said column in a predetermined aspect in which the spirit level was horizontally positioned.

5. For positioning dental base-plates used in the preparation of dental prosthetic devices, a bite-plate support to be employed in connection with an articulator, comprising: an upright column to be mounted in an articulator base for support, a stud pivotally mounted on the upper end of said column to laterally swing about a horizontal axis, means for selectively swinging and for securing said stud in adjusted positions relative said column, a bite-table having a quick detachable connection with said stud and so arranged that the horizontal pivot axis of said stud coincides with the upper surface of said bite-table, and a spirit level swingably carried by said bite-table at right angles to said horizontal pivot axis to indicate when the bite-table is positioned on said column in a predetermined aspect in which the spirit level was horizontal.

6. The structure according to claim 5 in which the means for selectively swinging and for securing said stud relative said column includes a laterally disposed manually operable screw, and a nut movable upon rotation of said screw and connected by a link to said stud whereby lateral movement of the nut produces a rocking movement of said stud on its pivot.

7. The structure according to claim 5 in which the means for selectively swinging and securing the stud relative said column includes a lead screw mounted for rotation in the column laterally of said pivot, a traveller nut on said screw, and a link between said nut and said stud for translating movement of said nut along screw into lateral rocking movement of the stud on said column and for holding said stud in adjusted position.

8. For positioning dental base-plates used in the preparation of dental prosthetic devices, a bite-plate support to be employed in connection with an articulator, comprising: an upright column to be mounted in an articulator base for support, a stud pivotally mounted on the upper end of said column to laterally swing about a horizontal axis, a bite-table having a quick detachable connection with said stud and so arranged that the horizontal pivotal axis of said stud coincides with the upper surface of said bite-table, a spirit level swingably carried by said bite-table at right angles to said horizontal axis of pivot to indicate when the bite-table is positioned on said column in a predetermined aspect in which the spirit level has horizontally positioned, and an upper model support overlying said bite-plate and including a base element to be secured in the articulator and a model receiving plate connected thereto by hinge means having an axis of swing that is horizontally transverse of the articulator.

9. For positioning dental base-plates used in the preparation of dental prosthetic devices, a bite-plate support to be employed in connection with an articulator, comprising: a column to be mounted upright in an articulator base for support, a bite-table removably and pivotally connected to said column so that the axis of pivot is lateral of the articulator and coincides with the upper surface of said bite-table, and a spirit level swingably carried by said bite-table to indicate when said bite-plate is positioned on said column in a predetermined aspect in which the spirit level was horizontal.

DUNCAN S. McPHEE.

REFERENCES CITED

The following references are of record in the file of this patent:

UNITED STATES PATENTS

| Number | Name | Date |
|---|---|---|
| 1,362,602 | Coble | Dec. 21, 1920 |
| 1,674,088 | Bodine | June 19, 1928 |
| 1,703,105 | Hawksworth | Feb. 26, 1929 |
| 1,830,248 | Smith | Nov. 3, 1931 |
| 1,931,804 | Sanborn | Oct. 24, 1933 |
| 2,001,963 | Keller | May 21, 1935 |
| 2,171,759 | Meyer | Sept. 5, 1939 |
| 2,334,643 | Moore | Nov. 16, 1943 |

FOREIGN PATENTS

| Number | Country | Date |
|---|---|---|
| 720,175 | France | Dec. 3, 1931 |